United States Patent Office.

STANLEY W. NEUER, OF NEW YORK, N. Y.

MEDICAL COMPOUND.

SPECIFICATION forming part of Letters Patent No. 321,839, dated July 7, 1885.

Application filed February 16, 1885. (No specimens.)

*To all whom it may concern:*

Be it known that I, STANLEY W. NEUER, a citizen of the United States, residing at New York, in the county and State of New York, have invented new and useful Improvements in Medical Compounds, of which the following is a specification.

This invention has for its object to provide a new and efficient medical compound as a remedy for skin diseases, wounds or sores, sore throat, catarrh, and other diseases.

The invention consists in a medical compound composed of thymol, boracic acid, chlorate of potash, chloride of sodium, and oil of wintergreen, as hereinafter more fully set forth.

In carrying out my invention I take crystallized thymol, about three ounces; boracic acid, about three pounds; chlorate of potash, about one pound; chloride of sodium, about four ounces; oil of wintergreen, about twenty-five grains; distilled water, about one-hundred and sixty pounds.

The thymol, boracic acid, chlorate of potash, and chloride of sodium are dissolved in the water at a temperature of about 200° Fahrenheit. Then the oil of wintergreen is added to the solution, and after the whole has been intimately mixed it is allowed to cool, then filtered and bottled, ready for use.

If desired, oil of peppermint and oil of cloves may be added to the above-named compound, and if these oils are used they are added to the solution above named, together with the oil of wintergreen, in the proportion of about fifty grains of oil of peppermint and twenty-five grains of oil of cloves. A suitable aromatic substance—such, for instance, as oil of rose—may also be added for the purpose of concealing the disagreeable odor of the thymol.

My compound is intended more particularly for external application in the form of a lotion, and its advantage arises from the co-operation of the different properties of its ingredients. For instance, in skin diseases, on the application of my lotion to the skin the chlorate of potash opens the pores and admits the solution, while the pores are again closed by the boracic acid, so that the skin retains that portion of the lotion which it has already absorbed. Furthermore, the combined thymol and chloride of sodium and oil of wintergreen form one of the best antiseptics which I have been able to prepare. Again, in wounds or sores on applying my lotion the boracic acid acts as a cleansing and purifying agent with the chlorate of potash and chloride of sodium, while the thymol dries the pus or purulent matter.

My compound can also be used with advantage for curing sore throat, catarrh, hay-fever, or other diseases of a similar nature.

What I claim as new, and desire to secure by Letters Patent, is—

The herein-described medical compound, consisting of thymol, boracic acid, chlorate of potash, chloride of sodium, and oil of wintergreen in about the proportions above set forth.

In testimony whereof I have hereunto set my hand and seal in the presence of two subscribing witnesses.

STANLEY W. NEUER. [L. S.]

Witnesses:
 W. HAUFF,
 E. F. KASTENHUBER.